Feb. 7, 1939.　　　C. W. MAYER ET AL　　　2,146,507
COATING MACHINE
Filed Dec. 5, 1935　　　5 Sheets-Sheet 1

Charles W. Mayer
and
Walter Lueders
INVENTORS
BY Russell B. Griffith
THEIR ATTORNEY Charles W. Mayer
and Walter Lueders
INVENTORS Feb. 7, 1939. C. W. MAYER ET AL 2,146,507
COATING MACHINE
Filed Dec. 5, 1935 5 Sheets-Sheet 4

Charles W. Mayer
and
Walter Lueders
INVENTORS
BY
THEIR ATTORNEY

Feb. 7, 1939.  C. W. MAYER ET AL  2,146,507
COATING MACHINE
Filed Dec. 5, 1935   5 Sheets-Sheet 5

INVENTOR.
Charles W. Mayer and Walter Lueders
BY
their ATTORNEY.

Patented Feb. 7, 1939

2,146,507

UNITED STATES PATENT OFFICE 2,146,507

COATING MACHINE

Charles W. Mayer and Walter Lueders, Rochester, N. Y.; said Lueders assignor to said Mayer Application December 5, 1935, Serial No. 53,052

12 Claims. (Cl. 91—18)

Our present invention relates to coating machines for producing laminated fabrics and more particularly to machines of the group type that includes carbon paper making machines wherein a wax-like substance intermixed with a pigment is spread upon a thin paper web for manifolding and similar purposes, and the invention has for its object to provide a simple, convenient and dependable machine of this character that will uniformly produce a superior product of the kind. The improvements are directed in part toward the means for containing and feeding a coating material or "dope", as it is called, upon the web; toward means for flattening and preparing the web prior thereto; toward means for insuring a uniformly distributed application of the dope to the receiving surface; toward means, in extension of the last mentioned end, that prevent the otherwise objectionable accumulations of excess dope on the margins of the web, and toward means for marking the coated fabric in a distinctive manner without, however, interfering with the uniformity of the coating in either its thickness or its usual and desired surface characteristics. To these and other ends, the invention resides in certain improvements and combinations of parts, all as will be hereinafter more fully described, the novel features being pointed out in the claims at the end of this specification.

In the drawings.

Similar reference numerals throughout the several views indicate the same parts.

To first give a general idea of the major elements and the principle of operation of the machine, it departs in theory from customary practice in that the dope (heated to the proper viscosity) is applied to the upper or outer surface of a reach of paper webbing instead of the under or inner side, to which end the web is led at the front of the machine upwardly across a vertical smoothing table, whereon it is stretched and rendered flat, and thence rearwardly in a horizontal or slightly inclined path. Adjacent to the smoothing table a specially prepared equalizing rod abruptly depresses a transverse hollow in the web. An overhead dope pan feeds the coating material by gravity uniformly in rear of this equalizing rod with the addition of certain dispersing devices so that it forms a uniform wave from side to side adjacent to the rod, so that the receiving surface is inevitably covered with a film of even thickness. Next, an air blast removes excess accumulations at the margins of the paper, whereafter a surface cutting roll impresses any desired design in the coating in such way, however, that it is hardly distinguishable except by transmitted light and in no way interferes with the function of effecting an even transference of the carbon to a writing surface under type. The web when carried a sufficient distance to dry or set is wound evenly and without the necessity of wasteful trimming into a finished roll.

Figure 1:
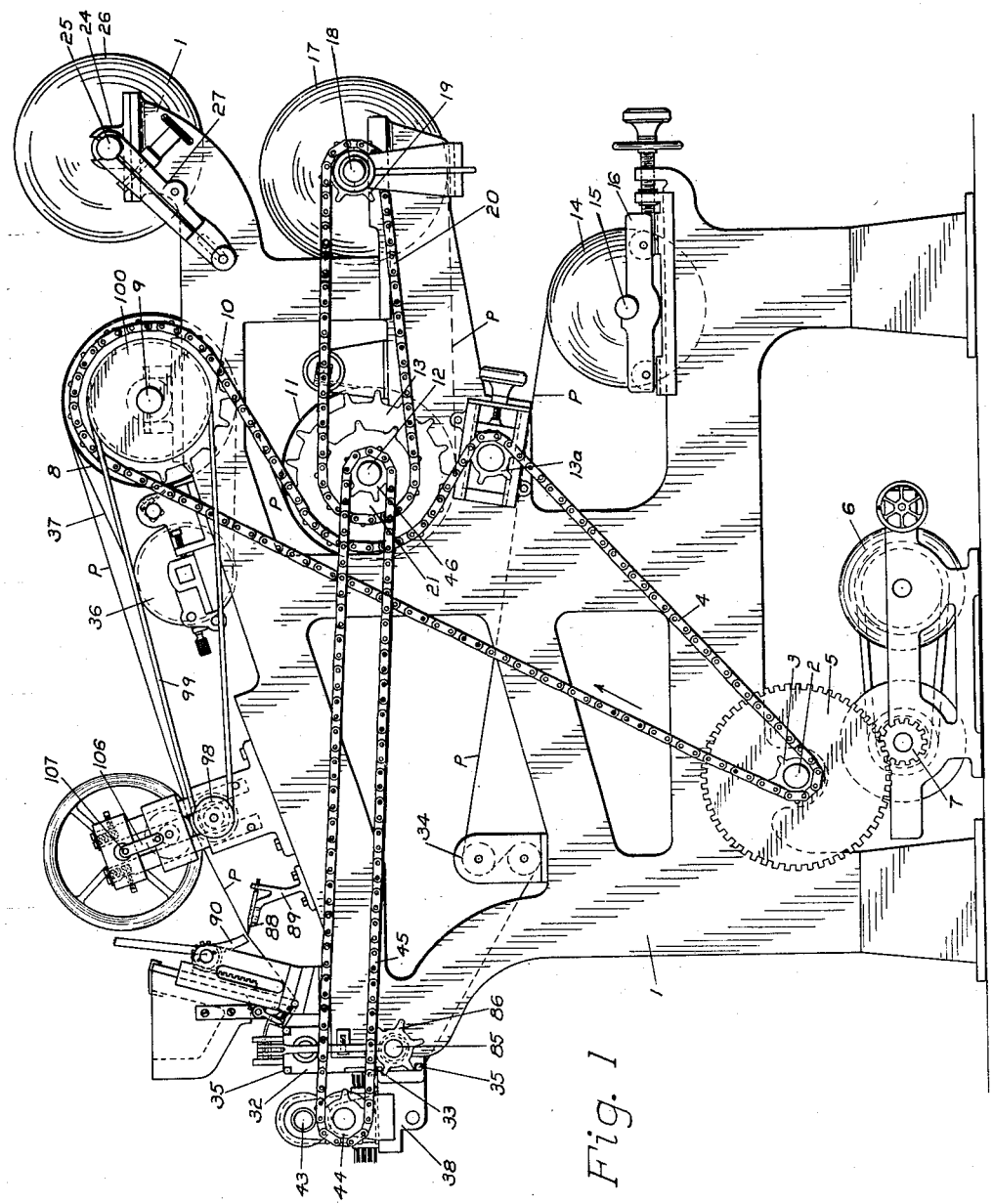
Fig. 1 is a side elevation of a coating machine constructed in accordance with and illustrating one embodiment of our invention, with a paper web threaded therethrough.
Figure 2:
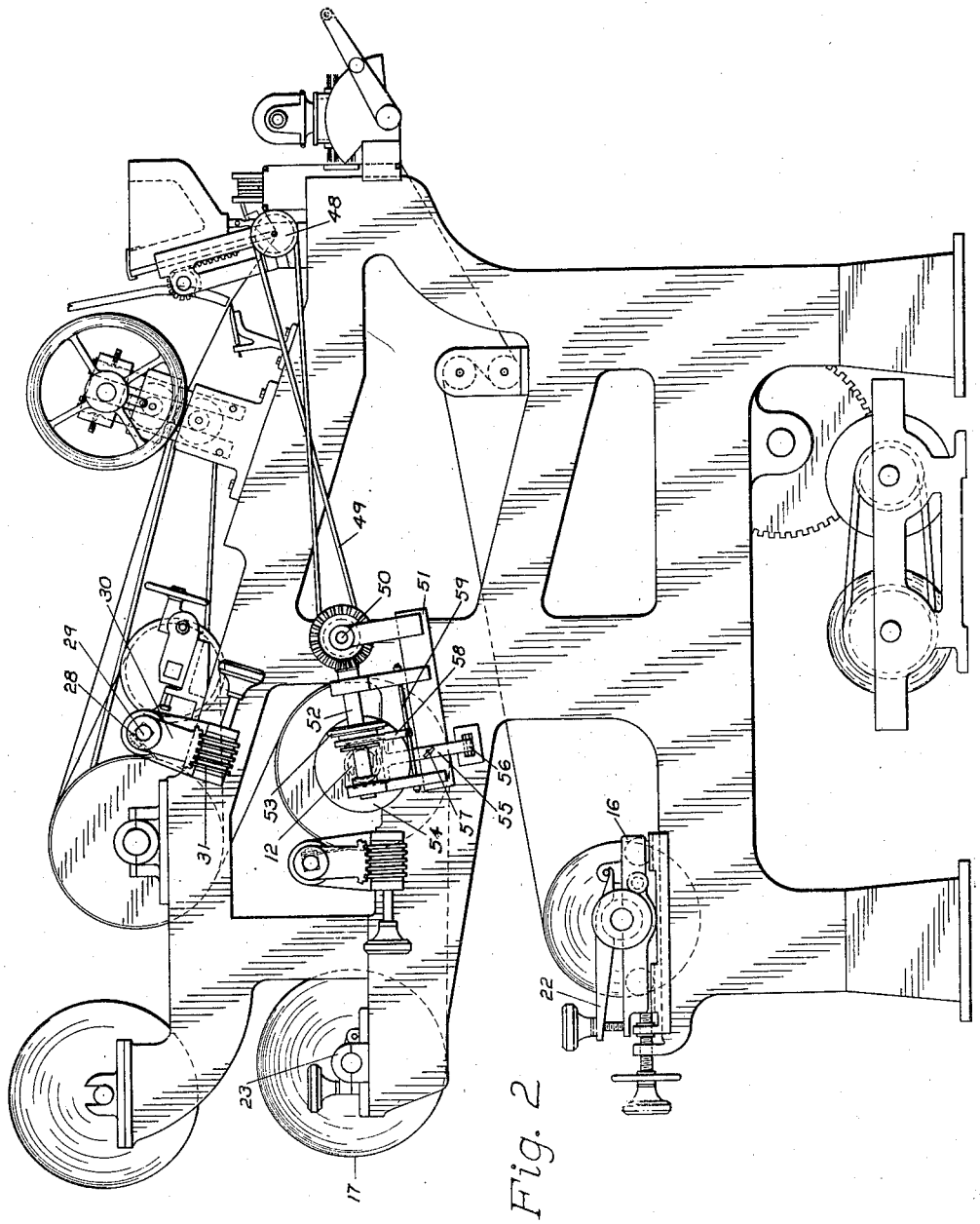
Fig. 2 is a similar elevation of the opposite side of the machine.

Referring more particularly to the drawings and first to Figs. 1 and 2 thereof, 1 indicates a main frame having a lower main driving shaft 2 carrying a sprocket 3 operating an endless sprocket chain 4. In the present instance, power is transmitted to the driving shaft by a gear 5 thereon through a power unit embodying a motor 6 and a belt driven pinion 7, all of which obviously appears. The sprocket chain 4, running in the direction of the arrows, turns a cooling drum 8 on a shaft 9 at the top of the machine through a sprocket 10 thereon from where it runs to turn a second cooling drum 11 on a shaft 12 through a similar sprocket 13 thereon and thence around an adjustable idler sprocket 13a back to the driving shaft. The paper P is supplied from a lower mill roll 14 at the back of the machine, the journals 15 of the core of which turn in open bearings in an adjustable cradle 16. The take-up of winding roll 17 on a core shaft 18 above and also at the rear is turned by a sprocket 19 through a chain 20 running from a second sprocket 21 on drum shaft 12 on a ratio adapted to the speed of chain 4. This, taken with the adjustability of the cradle 16 and friction bearing brakes 22 and 23 on the mill roll and the winding roll, permits the tension on the web to be readily and indiscriminately adjusted so that the latter is held straight longitudinally in its reaches with just enough tension not to over-strain it.

Sometimes it is desired to inter-leave a tissue of dry paper between the convolutions built up on the winding roll 17, for which purpose bearings 24 for the core 25 of another mill roll 26 of this material is arranged above the winding roll 17 in connection with an adjustable friction brake 27 so that a web may be led therefrom down to the receiving bite of the latter roll.

As the cooling drums 8 and 11 are otherwise apt to become fouled with particles of dope that interrupt the desired smoothness of their surfaces, doctor blades 28 are arranged to scrape their clear surfaces between stretches of the web. These are pivoted on shafts 29 having fixed thereto segment arms 30 meshing with hand operated worms 31 to adjust them into proper contact and the reverse.

At the front of the machine (the left end in Fig. 1 and the right end in Fig. 2) is a supplementary frame 32 (see also Fig. 4) having on its vertical outer face a smooth plate 33. The course of the paper web P, as generally shown, proceeds from the mill roll 14 between the sides of the main frame around a pair of idlers 34, thence upwardly across plate 33 and horizontally across the top of frame 32 with the assistance of rollers shown on the corners of the latter, as indicated at 35. It turns rearwardly from here to pass through various instrumentalities about to be described interposed between frame 32 and the first cold roll 8, reversely around the latter and the second cold roll 11 to be finally wound up at 17. The mechanism shown just forwardly of roll 8 comprises two end pulleys 36 with suitable adjusting and tensioning devices that carry narrow metal belts 37 of extreme thinness and flexibility that run around the ends of the first cold roll 8 and build up its diameter in the region of the margins of the web passing over the same, so that the web will be stretched laterally from the center at this point on the principle of the tendency of an ordinary belt to climb to the high point of a crown pulley, the belt in this instance being the paper itself.

Returning to the front end of the machine and the plate 33, we arrange on a bracket 38 a brush unit embodying two endless flexible belts 39 running in opposite directions from the median line of the web toward and across its lateral margins. These carry bristles 40 which, in opposition to the plate 33, brush the surface of the web, holding it thereagainst and stretching it laterally thereon, so that it will be perfectly smooth as it passes over the top of the frame 32. The mounting and driving connections of these brushes have not been shown in great detail, inasmuch as, per se and outside of their function in the present particular combination, they are disclosed in prior patent, No. 1,283,851, of November 5, 1918. Suffice it to say that they run over pulleys 41 on vertical studs 42 (Fig. 3) driven through miter gears on a shaft 43 (Fig. 1). This is driven in turn from a sprocket and pulley 44 and a sprocket chain 45 running to a third sprocket 46 on drum shaft 12.

Figure 3:
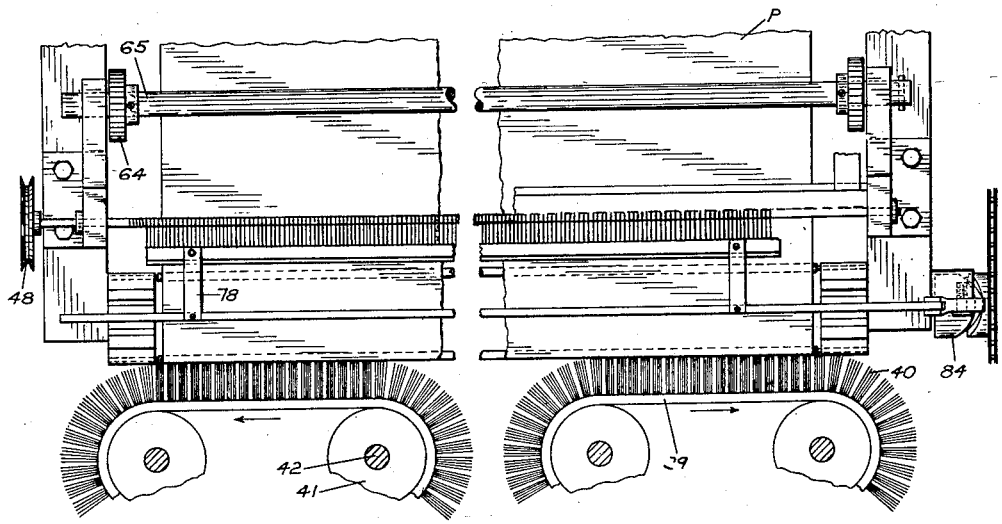
Fig. 3 is an enlarged top plan view, broken away at the center and also rearwardly of the front end of the machine in the region where the paper is prepared and the dope applied, certain overlying parts being removed or omitted to reveal underlying mechanisms.
Figure 5:
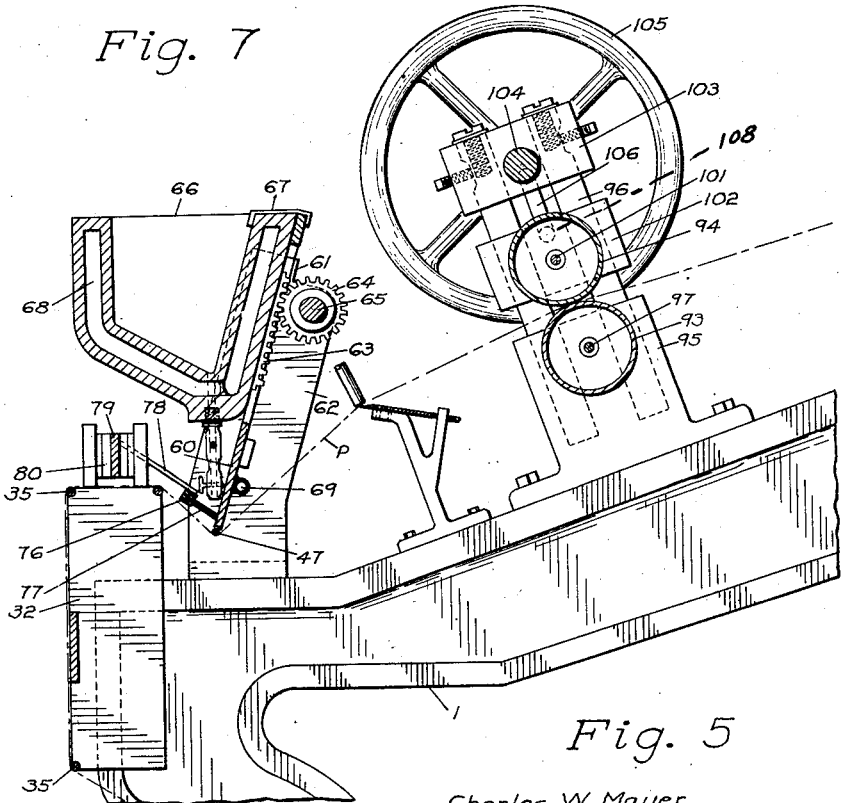
Fig. 5 is an enlarged longitudinal central section through the feed portion of the machine disclosed in Figs. 3 and 4.
Figure 11:
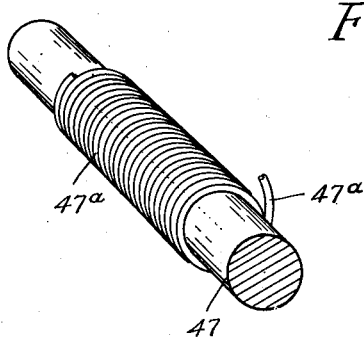
Fig. 11 is an enlarged fragmentary detail of an element of the spreading devices of the coating mechanism.
Figure 10:
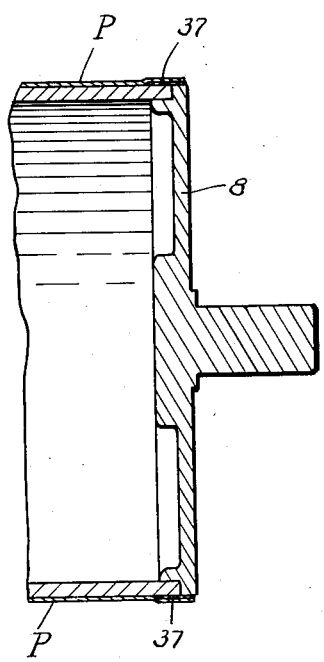
Fig. 10 is a section on the line 10—10 of Fig. 9.
Figure 9:
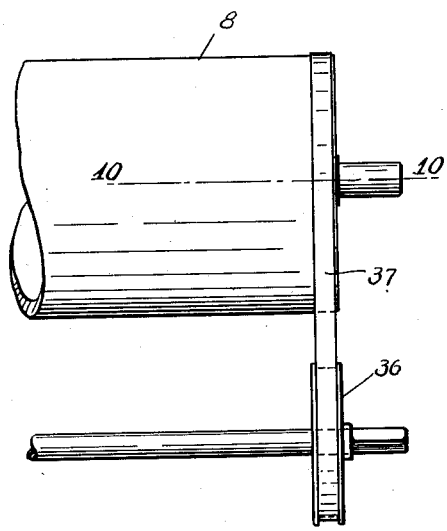
Fig. 9 is an enlarged fragmentary top plan view of a belt connection at the ends of one of the rolls with adjacent parts omitted.

Referring now principally to Figs. 3 and 5, the rearward course of the web after leaving the frame 32 carries it sharply downwardly and thence sharply upwardly, as shown in dotted lines in the latter figure, beneath a transverse equalizing rod 47, which latter produces a sustained abrupt depression therein. This rod is, and is called, an equalizing rod because it performs the function of equally distributing the film of dope across the web by virtue of the fact that its contacting peripheral surface is constituted by a fine or coarse wire 47a (Fig. 11), according to the service required, wound tightly helically throughout its length in the manner of the rod of like nature shown and fully explained in another combination in the prior patent above referred to. It is rotated at a peripheral speed constant with that of the contacting surface of the web by a pulley 48 (Fig. 2) and a belt 49 running to a pulley on a stud 50 in a transmission unit represented generally by a bracket 51 secured to the left side of the frame of the machine and provided with suitable bearing extensions. A stub shaft 52 on this bracket drives the pulley on shaft 50 through the miter gearing shown by a friction wheel 53 slidable thereon but turning therewith in contact with a friction disk 54 carried by drum shaft 12, which disk similarly turns with the latter but is adjustable longitudinally thereon. A shipper yoke 55 pivoted to the frame 1 at 56 establishes the proper frictional contact between wheel 53 and disk 54 for driving relationship in a well-known manner through adjustment of a thumb bolt 57 on the shipper, which reacts against the bracket 51. Another relatively transverse shipper 58 slidable and forwardly adjustable on a guide 59 on the bracket in much the same manner adjusts the friction wheel 53 to a larger or smaller radial contact with disk 54 whereby the driving speed of the transmission through to the equalizer rod 47 may be nicely regulated and controlled to give just the right rolling contact of the latter with the surface of the web. The equalizer rod is capable of being withdrawn endwise from its bearings for cleaning, substitution, and other purposes.

Equalizer rod 47 is relatively light, that is, of quite small diameter, because were it large it would have too extended a tangential contact surface with that of the web. Being also quite long, it is desirable to back it up and reinforce it against yielding from a true axis, for which purpose there is provided a slightly inclined plate 60 above the web and inclined rearwardly in the direction of its travel. It is about the thickness of the equalizer rod and its lower end is notched, as shown, to form a bearing for the top thereof substantially throughout its length. The bearings of the rod itself and guide 61 for the plate 60 are carried by brackets 62 rising from the main frame 1 so that the plate may be readily removed or raised out of the way for the beforementioned threading purposes. To the latter end, it carries racks 63 on its rear face with which mesh pinions 64 on a shaft 65 having bearings in the bracket and operated by the attachment of a hand crank. This plate 60 is also utilized to carry an overhead dope pan in the form of a transverse trough 66 which is detachably suspended against its face by clips 67 engaging over its top edge. It embodies a heating jacket 68 connected to a suitable steam supply as, in the machine of the present embodiment, the dope is of a waxy nature and requires a moderately high temperature to maintain a workable viscosity. Similarly, the plate 60 has a steam pipe 69 extending across its rear side for the same purpose. Across the bottom of the dope pan to drain the contents thereof is a line of pet-cocks 70, only one of which is shown in full in the drawings, the others in repetition thereof being conventionally outlined. These are controlled by the usual rotary hand valve 71 to regulate their capacity and feed, but a gate valve is provided for all that simultaneously closes them quickly when it is desired to effect an entire shut-off of the feed to be later resumed on the same basis. This common valve consists, in the present instance, of a rod 72 having an end 73 threaded into a bracket 74 depending from one end of the pan, said threaded portion being provided with a crank 75 at that end and a suitable bearing at the other end.

The drain cocks 70 are arranged to discharge by gravity closely against and upon the lower end of the inclined plate 60 just above the equalizer bar 47 within the depression in the web formed by the latter, as aforesaid. The rate of feed is such that a small but distinct wave of dope is formed behind the equalizer bar that has an opportunity to thoroughly impregnate or, rather, attach itself to the surface of the web.

But, even with the multiplicity of dope depositing points 70, this wave might not be absolutely uniform in depth and consistency across the breadth of the web, resulting in light and dark contrasting streaks in the coating, were not means provided for preventing high points or points of concentration directly below each drain cock where the viscous fluid has not had time to spread. We, therefore, provide such a means in the present form of a brush embodying a back 76 and bristles 77. These bristles are relatively long and stiff, are disposed at an angle substantially normal to the face of the plate and lightly engage the latter at their tips to form therewith a V-shaped cavity not unlike the wave cavity behind the equalizing rod but above it and between the latter and the nozzles of the pet-cocks. The effect is that the dope from the nozzles directly or flowing down the plate encounter and are dispersed by the bristles, which become saturated and from then on the dope by gravity becomes disposed in an even flowing ribbon that creates the uniform wave desired behind the equalizing rod.

Figure 4:
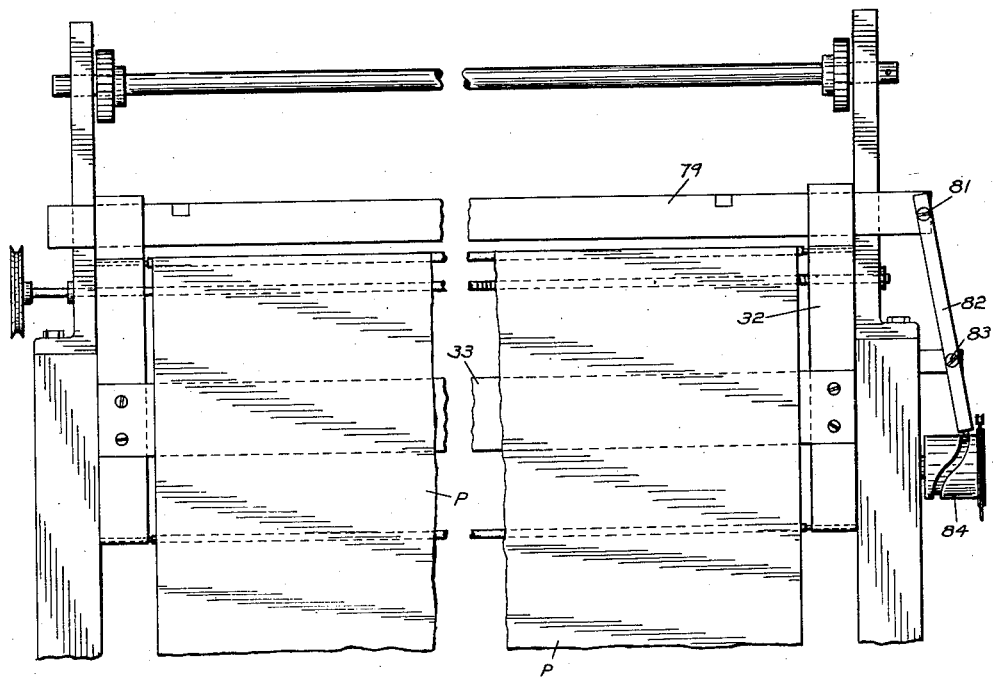
Fig. 4 is a fragmentary front elevation of the same nature and on the same scale as Fig. 3 with the smoothing portions removed.

To accentuate and improve even this dispersion, we further vibrate the bristles 77 endwise which produces both a wiping and a settling agitation. For this purpose, the brushes are carried by arms 78 secured to the backing 76 and to a reciprocatory bar 79 slidable in suitable bearings 80 on top of the frame 32 (Figs. 3, 4 and 5). One end of this bar has a wrist pin connection at 81 with a lever 82 fulcrumed at 83 on an arm projecting from the frame 32 and having its lower end traversing the groove of a rotary track cam 84 having bearings in the frame 32. This is mounted on a stud 85 and carries a sprocket 86, by means of which it is driven by the same chain 45 that drives the sprocket of the smoothing brushes 39—40 and at an appropriate relatively low speed.

Figure 8:
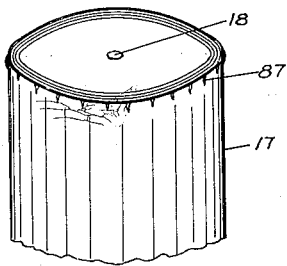
Fig. 8 is a fragmentary view of the end of a row of corded material, illustrative of the deficiencies of prior practices in the art with which we are familiar.
Figure 6:
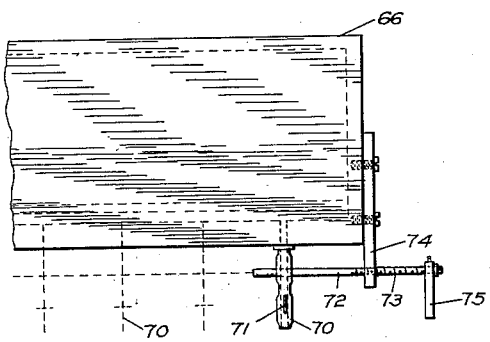
Fig. 6 is a fragmentary detail of the dope box and its controls.
Figure 7:
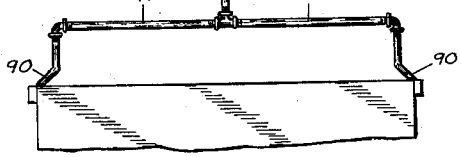
Fig. 7 is a detail view, taken from the front, of the air blast arrangement for treating the margins of the web.

Turning now in addition to Figs. 7 and 8, in the operation of a coating machine of this character, a peculiar phenomenon occurs persistently, and that is that, with the best of spreading devices for the viscous dope, longitudinal rills of the latter are accumulated along the margins of the web due apparently to a surface tension that is set up at that point. This results in the coating being thicker at its edges than in the center, so that, as it is wound on the take-up roll 17, the successive convolutions build up the diameter at the edges more rapidly than over the rest of the expanse. This finally stretches the paper beyond endurance with the result that it splits back on the ends of the roll 17, as indicated at 87 in Fig. 8. Subsequently and consequently, this end brush has to be trimmed off back to the non-checked area, which is wasteful and necessitates an extra operation. We eradicate or prevent the formation of these rills through the following instrumentalities:

Closely in rear of the feed plate 60, or at a point where the coating on the running web is still in a fluid state, we arrange beneath it an extra support, in the present form of an inclined blade 88 carried by brackets 89 on the main frame 1. The proximate reach of the web slides over this in a slightly raised condition. Opposed to this blade above the web and as close as practicable to the surface thereof at each edge is a nozzle 90 leading from pipes 91. These, in the present instance, are siamesed upon a compressed air supply 92. The nozzles are preferably spread or inclined outwardly, whereby steady blasts of air therefrom impinge upon the solidly supported margins of the web and continuously blow them clean of accumulations of dope before these rills have had a chance to dry, rendering the resulting laminated fabric as thin at the edges as in the central area.

Also, before the web has reached the first cold roll 8, by which its coating is set, and while the latter, as may be said, is neither solid nor viscous, the web is run through a surface marking unit, best shown in Figs. 1 and 5. This consists of a lower yieldingly surfaced plate roll 93 and an upper impression die roll 94 which, in cooperation with the first, finally cuts a desired name, design or imprint upon the coating only. This does not remove any of the latter, change its thickness or greatly disturb it beyond making fine incisions which, when the product is suitably disposed, may be observed by transmitted light. In this way, the manufacturer may place a distinctive marking upon his product not ordinarily observable and not interfering with its effectiveness in manifolding, but which may be resorted to as a test of origin.

The particular mounting of these rolls is immaterial but, in the present instance, they are carried primarily by blocks 95 on the main frame, rising from which are guide standards 96. The platen roll shaft 97 has suitable bearings in these blocks and terminates in a pulley 98 driven by a belt 99 from a pulley 100 on the shaft 9. The shaft 101 of the impression roll 94 is carried by bearing blocks 102 slidable on the standards 96. The upper ends of the latter are connected by adjustable but otherwise rigid bearing blocks 103 in which is journalled a shaft 104 having a hand wheel 105. Pitmans 106 having eccentric wrist pin connections 107 with shaft 104 are pivoted at 108 to the blocks 102 with the result that they can be forcibly raised and lowered to get the proper contact between the marking rolls 93—94.

We claim as our invention:

1. In a web coating machine of the character described, the combination with a frame having a plurality of devices for guiding and supporting a travelling web including a vertically disposed guide plate at the front of the frame and an equalizer bar arranged to depress the web rearwardly of the plate, of means for feeding dope on the top side of the web in the region of the equalizer bar, and a pair of endless brushes travelling in opposite directions for smoothing and stretching the web from the center toward its respective edges against the plate.

2. In a web coating machine of the character described, the combination with a frame having a plurality of devices for guiding and supporting a travelling web, including means on its top side for abruptly depressing it, of means above the depressing means for depositing a wave of viscous dope in advance thereof on the upper surface of the web, said depressing means embodying a rotary rod having a contacting surface formed by a wire helically wound closely thereon.

3. In a web coating machine of the character described, the combination with a frame having a plurality of devices for guiding and supporting a travelling web, including means on its top side for abruptly depressing it, of an inclined plate arranged above the depressing means, a dope supply arranged to feed a stream of viscous dope upon the plate and gravitationally form a wave thereof in front of the depressing means, and a bristled brush interposed between the dope supply and the depressing means in cooperation with the plate to disperse and distribute the flow of dope to the depressing means.

4. In a web coating machine of the character described, the combination with a frame having a plurality of devices for guiding and supporting a travelling web, including means on its top side for abruptly depressing it, of an inclined plate arranged above the depressing means, a dope supply arranged to feed a stream of viscous dope upon the plate and gravitationally form a wave thereof in front of the depressing means, a bristled brush interposed between the dope supply and the depressing means in cooperation with the plate to disperse and distribute the flow of dope to the depressing means, and means for vibrating the brush across the face of the plate.

5. In a web coating machine of the character described, the combination with a frame having a plurality of devices for guiding and supporting a travelling web, including means on its top side for abruptly depressing it, of means above the depressing means for feeding a plurality of streams of viscous dope to the web to form a wave in advance of the depressing means, and a bristled brush interposed between the depositing means and the web to disperse the streams of dope.

6. In a web coating machine of the character described, the combination with a frame having a plurality of devices for guiding and supporting a travelling web, including means on its top side for abruptly depressing it; said depressing means embodying an equalizing rod of relatively small diameter, of a plate the lower edge of which has a bearing against the rod to back up the same, and means for feeding dope to the web in rear of the plate to form a wave in rear of the rod.

7. In a web coating machine of the character described, the combination with a frame having a plurality of devices for guiding and supporting a travelling web, including means on its top side for abruptly depressing it, said depressing means embodying an equalizing rod of relatively small diameter, of a plate the lower edge of which has a bearing against the rod to back up the same, said plate having a lower portion inclined in the direction of travel of the web, and means for depositing dope on the incline so that a wave thereof is formed in rear of the equalizing rod.

8. In a web coating machine of the character described, the combination with a frame having a plurality of devices for guiding and supporting a travelling web, including means on its top side for abruptly depressing it, said depressing means embodying a detachable equalizing rod of relatively small diameter, of a plate inclined in the direction of travel of the web and the lower edge of which has a bearing against the rod to back up the same, means for depositing dope on the plate so that a wave thereof is formed in rear of the equalizing rod, a guide for the plate on the frame, and means for raising and lowering the plate out of and into cooperation with the rod.

9. In a web coating machine of the character described, the combination with a frame having a plurality of devices for guiding and supporting a travelling web, including means on its top side for abruptly depressing it, said depressing means embodying a detachable equalizing rod of relatively small diameter, of a plate inclined in the direction of travel of the web and the lower edge of which has a bearing against the rod to back up the same, a guide for the plate on the frame, means for raising and lowering the plate out of and into cooperation with the rod, and a dope pan mounted on the plate for depositing dope thereon so that a wave thereof is formed in rear of the equalizing rod.

10. In a web coating machine, the combination with devices for guiding and supporting a travelling imperforate web and means for applying a film of dope to one surface thereof, of means for delivering and directing forcible air blasts tangentially against the imperforate margins only of the web on the coated side thereof to remove excess dope therefrom, said air blasts being so delivered in a direction angularly away from such margins.

11. In a web coating machine, the combination with devices for guiding and supporting a travelling web and means for applying a film of dope to one surface thereof, of a pair of nozzles at the respective margins of the web inclined laterally from the median line on the coated side thereof and means for supplying compressed air to the nozzles to blast excess dope from the margins only of the web.

12. In a web coating machine, the combination with devices for guiding and supporting a travelling web and means for applying a waxy coating to the top surface thereof, one of said supporting devices being arranged below the web in rear of the coating means, of a pair of diverging nozzles directed against the margins of the web above the last mentioned support so that the web at these points passes closely between the latter and the nozzles, and means for supplying compressed air to the nozzles to blast excess coating from the margins only of the web.

CHARLES W. MAYER.
WALTER LUEDERS.